June 7, 1949.  W. H. DU BOIS  2,472,697
AUTOMATICALLY ADJUSTABLE DISK BRAKE
Filed Oct. 10, 1945

INVENTOR.
WILLIAM H. DuBois
BY
T. J. Plante
ATTORNEY

Patented June 7, 1949

2,472,697

UNITED STATES PATENT OFFICE 2,472,697

AUTOMATICALLY ADJUSTABLE DISK BRAKE

William H. Du Bois, South Bend, Ind., assignor to Bendix Aviation Corporation, South Bend, Ind., a corporation of Delaware Application October 10, 1945, Serial No. 621,518

3 Claims. (Cl. 188—72)

This invention relates to disc brakes, and its primary object is to provide an improved self-adjusting disc brake wherein the clearance of the brake members will be automatically adjusted to prevent an excessive slack from developing in the operation of the brake. The self-adjusting brake has the advantages (1) of dispensing with the need for manual adjustment, and (2) of limiting the amount of movement required to apply the brake and thereby conserving travel of the operator operated control member.

With respect to the automatic adjusting mechanism per se, the present invention provides a particularly simple, inexpensive, and yet efficient arrangement.

Figure 1:
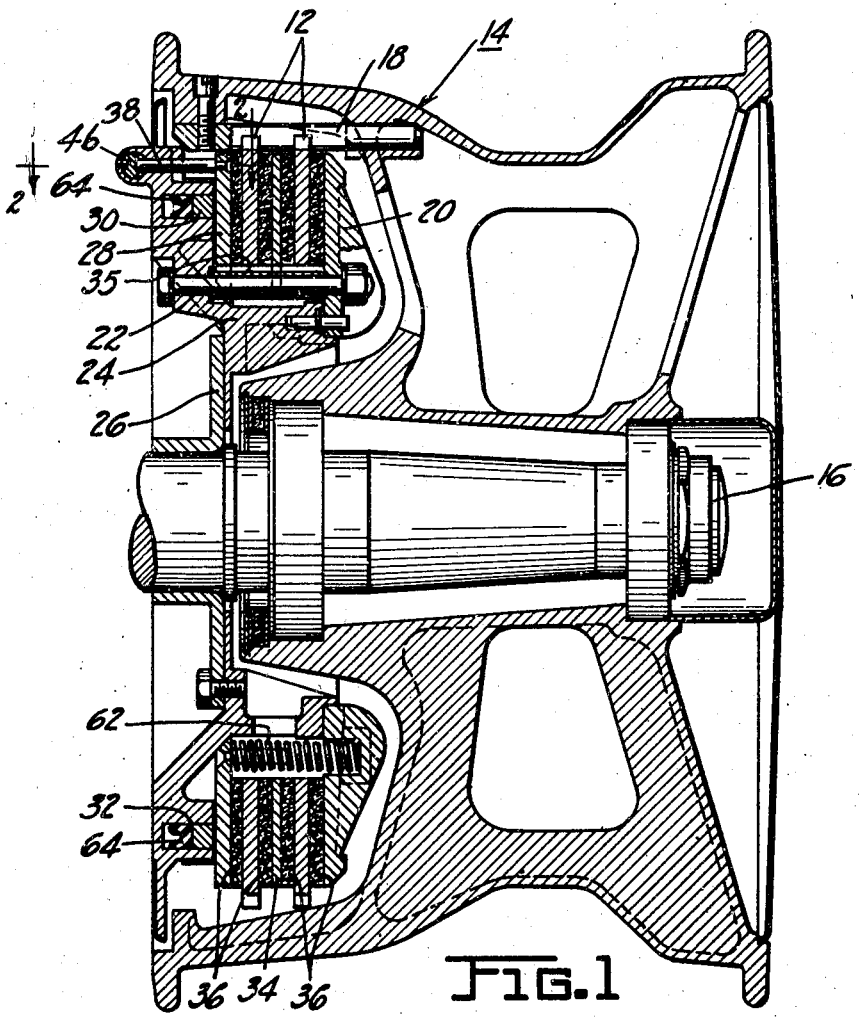
Figure 2:
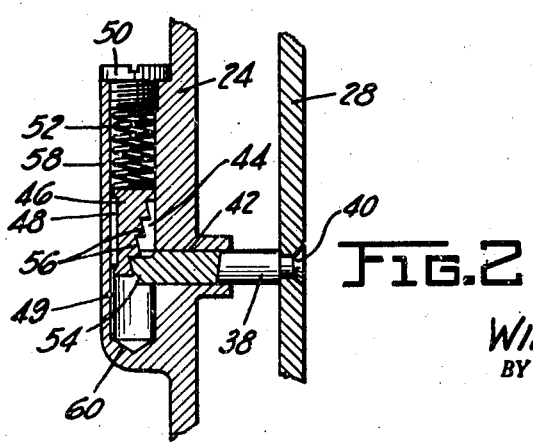

Other objects and advantages of the present invention will become apparent during the course of the following description, reference being had therein to the accompanying drawing, in which:

Figure 1 is a vertical section taken through a disc brake assembly which embodies the invention; and Figure 2 is a cross-section taken on the line 2—2 of Figure 1.

In general, the disc brake structure includes one or more rotor discs 12 which are keyed to a wheel 14 to rotate therewith, the wheel being rotatably mounted on an axle 16. The rotors are driven by a plurality of axially extending circumferentially spaced key members 18, which extend through slots formed in the peripheries of the rotors. The rotors are thus caused to rotate with the wheel, but they are free to move axially along the driving keys.

The stationary members of the brake comprise a first fixed member or backing plate 20, which may be secured by a plurality of circumferentially spaced bolts 22 to a second fixed member 24 which is located at the opposite side of the rotors 12 from first fixed member 20, and which is itself secured to a flange 26 on the axle 16.

The braking action is brought about by axial movement of a pressure plate 28 toward backing plate 20, pressure plate 28 in the illustrated embodiment being acted on by an annular piston 30 which reciprocates in an annular chamber 32 formed in member 24. If two rotors 12 are provided, as shown, a stator 34, which is axially movable but nonrotatable, is provided between the rotors, the stator being keyed to members 20 and 24 by means of the sleeves 35 carried by the bolts 22. The friction lining material is illustrated as being supported on the nonrotatable members of the brake, layers 36 of lining being secured to each side of stator 34, to the right side of pressure plate 28, and to the left side of backing plate 20.

When, under control of the operator, fluid under pressure is introduced into chamber 32, piston 30 will be moved toward the right, moving pressure plate 28 to develop a frictional resistance tending to retard rotation of the rotors 12 and wheel 14.

Successive applications of the brake cause wear of the frictional surfaces thereof, particularly the linings 36. If, after each application of pressure, the pressure plate 28 returns the full distance to the position shown in Figure 1, wherein it abuts against the right side of member 24, then, as wear of the friction surfaces occurs, each new application of the brake will require a greater movement of pressure plate 28 toward the right, thus necessitating the increased displacement of fluid from the fluid pressure creating device, such as the conventional operator operated master cylinder.

In order to automatically adjust the released position of pressure plate 28, and thereby prevent an excessive clearance from developing in the brake, I provide a plurality of circumferentially spaced axially extending positioning members 38 which are secured to pressure plate 28, and which move longitudinally as the pressure plate moves axially. A suitable number of the positioning members 38 is three, and they may be secured to the pressure plate by upsetting the ends thereof to form the rivet heads 40. Each of the positioning members 38 extends through an opening 42 provided in member 24, and each opening 42 intersects a substantially tangentially extending chamber 44 also provided in said member 24, and located near the outer edge thereof. Reciprocable in each chamber 44 is a toothed rack member 46, which is prevented from rotating inside the chamber by means of a suitable key 48 which extends into a groove 49 in the chamber wall. A plug 50 closes the open end of chamber 44, and a spring 52 is compressed between plug 50 and rack member 46, thereby urging said member 46 toward the opposite end of chamber 44.

The end of positioning member 38 which extends into chamber 44 is provided with a pawl or tooth 54 which engages with and is positioned by the teeth 56 of member 46. The released position of pressure plate 28 is therefore determined by positioning member 38 and by rack member 46, the latter being supported against the outer wall 58 of chamber 44.

Advancing from the end of member 46 which is nearest the wall 60 of chamber 44, toward spring 52, the teeth 56 are successively higher, as shown, or in other words, they gradually come somewhat nearer to friction members of the brake, the axially fixed member 20 being a suitable reference point.

The line of contact between pawl 54 and the teeth 56 of member 46 is such that spring 52 is unable to move member 46 toward the end wall 60 of chamber 44 until, during a brake application, pressure plate 28 is moved sufficiently far toward the right to lift pawl 54 clear of the tooth 56 located just above the pawl (as seen in Figure 2). As soon as pawl 54 is moved sufficiently far to clear one of the teeth, spring 52 will immediately move the next tooth into contact with the pawl. Upon return of the pressure plate 28 under the influence of return springs 62, the presence of the higher tooth under pawl 54 will prevent pressure plate 28 from returning all the way to its original position, thus limiting the clearance of the brake members. The relief angle above each tooth 56 provides sufficient drop back of pawl 54 to insure that there will always be enough clearance to prevent dragging of the friction surfaces of the brake.

Enough teeth should be provided on member 46 to take up the entire clearance of the brake elements when the several layers of lining 36 have been worn down to the rivet heads. As the released position of pressure plate 28 moves farther to the right, piston 30 will remain in contact with the pressure plate, the friction of the piston seal 64 being enough to insure this. Since the piston will not move all the way back to its initial position, an additional amount of fluid will be retained in chamber 32, the extra fluid being drawn from the reservoir, such as the reservoir of the conventional master cylinder.

From the above it will be apparent that a particularly simple and yet efficient automatic adjustment has been incorporated into a disc brake to make the brake self-adjusting and thereby attain the advantages in brake operation heretofore discussed.

Although a particular embodiment of my invention has been described, it will be understood by those skilled in the art that the object of the invention may be attained by the use of constructions different in certain respects from that disclosed without departing from the underlying principles of the invention. I therefore desire by the following claims to include within the scope of my invention all such variations and modifications by which substantially the results of my invention may be obtained through the use of substantially the same or equivalent means.

I claim:

1. A self-adjusting disc brake comprising a first fixed support member, a second fixed support member axially spaced from the first and having an annular chamber formed therein at the inner side thereof and a plurality of circumferentially spaced substantially tangentially extending chambers formed therein on the outer side thereof and each intersected by a perpendicular opening which leads to said inner side, an annular piston reciprocable in said annular chamber, a non-rotatable but axially movable pressure plate acted on by said piston, an axially movable rotor disc located between said first fixed support member and said pressure plate and adapted to be retarded by frictional resistance induced by axial movement of the pressure plate under the influence of the piston, a plurality of circumferentially spaced axially extending positioning members secured to said pressure plate, each having a pawl formed on the end thereof and each extending through the respective opening into one of said tangentially extending chambers, a plurality of circumferentially spaced toothed rack members cooperating with said positioning members to determine the released position of said pressure plate, each of said rack members being movable lengthwise in one of said tangentially extending chambers, the pawl of each positioning member being engaged and axially positioned by the teeth of one of the rack members, the successive teeth of each rack member becoming gradually higher in profile to come closer to the aforesaid first fixed support member, a key associated with each rack member for preventing rotation of the same in its chamber, and a spring located in each such chamber and acting on the respective rack member to urge it endwise in a direction to move a higher tooth under the pawl of the associated positioning member and thereby hold the pressure plate in an advanced position, the angle of the line of contact of each pawl with the teeth of the respective rack member being such as to prevent movement of the ratchet member under influence of the spring until the pressure plate moves more than a predetermined distance during a pressure stroke, and the angle of relief of the teeth of the rack member being sufficient to insure adequate clearance in released position of the rotor disc from the non-rotatable brake members.

2. A self-adjusting disc brake comprising a first fixed support member, a second fixed support member axially spaced from the first, means associated with said second fixed support member for exerting brake applying force, a nonrotatable but axially movable pressure plate acted on by said means, an axially movable rotor disc located between said first fixed support member and said pressure plate and adapted to be retarded by frictional resistance induced by axial movement of the pressure plate under the influence of the force exerting means, a plurality of circumferentially spaced axially extending positioning members secured to said pressure plate, each having a tooth formed on the end thereof, a plurality of circumferentially spaced toothed rack members cooperating with said positioning members to determine the released position of said pressure plate, each of said rack members being movable lengthwise in a plane perpendicular to the axis of the brake, the tooth of each positioning member being engaged and axially positioned by the teeth of one of the rack members, the successive teeth of each rack member becoming gradually higher from one end to the other of said member, and a spring acting on each rack member to urge it endwise in a direction to move a higher tooth into engagement with the tooth of the associated positioning member and thereby hold the pressure plate in an advanced position.

3. In a disc brake having a fixed support member, an axially movable rotor disc adapted to be retarded by frictional resistance, and a non-rotatable but axially movable member located on the opposite side of the rotor from said support member and movable toward said support member to cause retardation of the rotor, automatic adjusting mechanism comprising one or more axially extending positioning members secured to said non-rotatable but axially movable member and each having a tooth formed on the end thereof, one or more toothed members cooperating with said positioning members to determine the released position of the non-rotatable but axially movable member, each of said toothed members being movable lengthwise in a plane substantially perpendicular to the axis of the brake, the tooth of each positioning member being engaged and axially positioned by the teeth of one of said toothed members, the successive teeth of each such toothed member becoming gradually higher from one end to the other of said member, and means acting on each toothed member to urge it endwise in a direction to move a higher tooth into engagement with the tooth of the associated positioning member and thereby hold the non-rotatable but axially movable member in an advanced position.

WILLIAM H. DU BOIS.

REFERENCES CITED

The following references are of record in the file of this patent:

UNITED STATES PATENTS

| Number | Name | Date |
|---|---|---|
| 2,228,576 | Marino | Jan. 14, 1941 |
| 2,350,878 | Cowell | June 6, 1944 |
| 2,384,297 | Goepfrich | Sept. 4, 1945 |